United States Patent Office 2,788,354
Patented Apr. 9, 1957

2,788,354

4-PREGNENE-3,11,20-TRIONE-14α,17α-DIOL AND PROCESS

Eugene J. Agnello and Gerald D. Laubach, Jackson Heights, N. Y., assignors to Chas. Pfizer & Co., Inc., Brooklyn, N. Y., a corporation of Delaware No Drawing. Application May 25, 1954, Serial No. 432,314

4 Claims. (Cl. 260—397.45)

This invention is concerned with a method of preparing new steroid compounds. In particular it is concerned with preparing compounds having the general formula

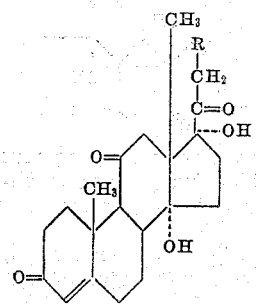

wherein R is selected from the group consisting of H, OH and esters and ethers thereof containing from one to ten carbon atoms in the added moiety.

The process of this invention comprises oxidation of the corresponding compounds which have an OH group in the 11 position, instead of the 11-keto group in the final product. These starting materials may be obtained by methods disclosed in the presently pending applications Serial No. 409,534 filed on February 10, 1954 (issued on February 22, 1955 as U. S. Patent 2,702,812) and Serial No. 415,972 filed on March 12, 1954.

The oxidation of the 11-OH group may readily be accomplished in good yield by treatment with an oxidizing agent, for example a chromate oxidizing agent such as chromic acid or a chromate salt in acetic acid at room temperature. When there is a 21-OH group, the yield is somewhat improved if the 21-OH group is protected by being converted to an ester or ether group prior to the oxidation, but the reaction may also be carried out in the presence of the free 21-OH group. As the 21-OH group is the only primary alcohol group present in any of the starting materials or products, it may be selectively esterified or etherified by standard methods, either before or after the oxidation. The equation for these reactions is therefore as follows:

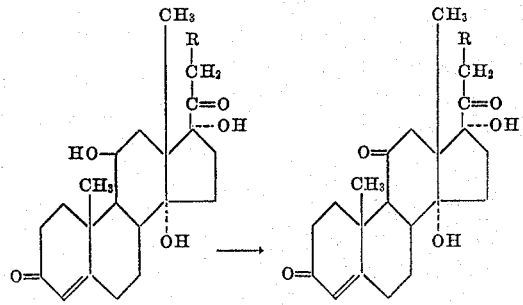

When R is, for example, hydrogen, the product is 14α,17α-dihydroxy-4-pregnene-3,11,20-trione. When R is OH, the product is 14α,17α,21-trihydroxy-4-pregnene-3,11,20-trione, and when R is —OCOCH₃ the product is 14α,17α,21 - trihydroxy - 4 - pregnene - 3,11,20 - trione-21-acetate.

Each of the products of this invention is extremely valuable and possesses great biological, adrenocortical type activity. For example, each of these compounds gives a positive thymus involution test. This type of compound has proved of great value in the treatment of certain diseases, for example arthritis. The products of this invention are also useful as intermediates for the synthesis of still other biologically active compounds, for example see application Serial Number 432,621 filed May 26, 1954, by Agnello et al.

EXAMPLE I

*Preparation of 14α-hydroxycortisone*

To 211 mg. of the 21-acetate of 14α-hydroxy compound F there was added 8 ml. of acetic acid and 6.5 ml. of a nine-to-one mixture of acetic acid and water, which mixture contained 50 mg. of CrO₃. The reaction mixture was maintained at room temperature for three hours. 170 mg. of 14α-hydroxy-cortisone-21-acetate was recovered. The crude product had the following physical constants: M. P. 231–233° with decomposition $$[\alpha]_D^{CHCl_3} + 235.9°; \quad \epsilon_{237}^{EtOH} \ 16,300$$

Recrystallization from methanol yielded the pure product as thick, short prisms, having the following physical constants: M. P. 262–263°

$$[\alpha]_D^{dioxane} + 236.8°; \quad \epsilon_{237}^{EtOH} \ 16,500$$

*Analysis.*—Calculated for C₂₃H₃₀O₇: C, 66.01; H, 7.23. Found: C, 66.12; H, 7.21.

The free 21-OH compound was prepared from the 21-acetate by saponification in methanolic bicarbonate at room temperature. The crude product was isolated by pouring the reaction mixture into water. Recrystallization of the crude alcohol from methanol gave the pure compound, 14α-hydroxycortisone, which may also be called 14α,17α,21 - trihydroxy - 4 - pregnene - 3,11,20-trione, as clusters of prisms with the following physical constants: M. P. 232–233° with decomposition $$[\alpha]_D^{dioxane} + 210.1°; \quad \epsilon_{237}^{EtOH} \ 15,900$$

*Analysis.*—Calculated for C₂₁H₂₈O₆: C, 67.00; H, 7.50. Found: C, 66.85; H, 7.53.

The 21-OH group was selectively esterified and etherified with a wide variety of groups. Standard methods, for example treating with acid anhydrides in pyridine to form the esters and treating with alkyl halides in base to form ethers, are useful. In general, esters and ethers containing from one to ten carbon atoms in the added moiety were readily formed by standard methods. The groups used included, for example, formate, acetate, propionate, trimethylacetate, benzoate, succinate, phthalate and cyclohexanecarboxylate among the esters, and methyl, ethyl and benzyl among the ethers.

EXAMPLE II

*Preparation of 14α,17α-dihydroxy-4-pregnene-3,11,20-trione*

In a manner analogous to that described in Example I, 11β,14α,17α-trihydroxy-4-pregnene-3,20-dione was oxidized with chromic acid in acetic acid at room temperature to give 14α,17α-dihydroxy-4-pregnene-3,11,20-trione. The crude product was white micro-crystals with the following physical constants: M. P. 258–260°

$$[\alpha]_D^{dioxane} + 198.3°$$

Recrystallization from methanol-acetone yielded an analytical sample as prisms with the following physical constants: M. P. 274–275° with decomposition $$[\alpha]_D^{dioxane} + 245.8°; \epsilon_{237.5}^{EtOH} 15,500$$

*Analysis.*—Calculated for $C_{21}H_{28}O_5$: C, 69.98; H, 7.82. Found: C, 69.42; H, 7.68.

The above examples are given solely for the purpose of illustration and are not to be construed as limitations on this invention.

What is claimed is:
1. A process for the preparation of a compound having the formula

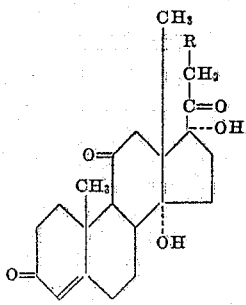

wherein R is selected from the group consisting of H, OH and hydrocarbon carboxylic acid esters and hydrocarbon ethers thereof containing from one to ten carbon atoms in the added moiety, which process comprises oxidizing with a chromate oxidizing agent in acetic acid a compound having the formula

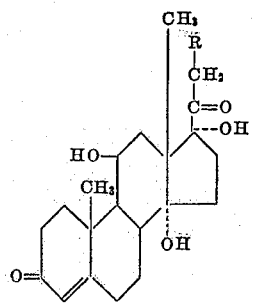

2. A steroid compound having the formula

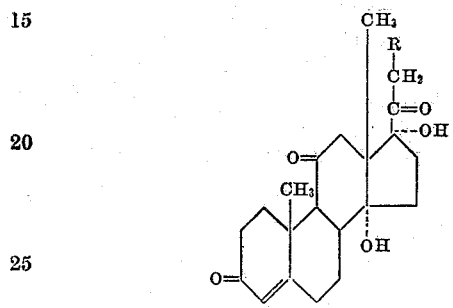

wherein R is selected from the group consisting of H, OH and the 21-position hydrocarbon carboxylic acid esters thereof containing from one to ten carbon atoms in the added moiety.

3. 14α,17α,21-trihydroxy-4-pregnene-3,11,20-trione.
4. 14α,17α-dihydroxy-4-pregnene-3,11,20-trione.

References Cited in the file of this patent
FOREIGN PATENTS
653,480    Great Britain _____ May 16, 1951